US012759549B2

(12) United States Patent
Kamatani

(10) Patent No.: US 12,759,549 B2
(45) Date of Patent: Oct. 13, 2026

(54) VEHICLE DRIVING ASSISTANCE APPARATUS

(71) Applicant: TOYOTA JIDOSHA KABUSHIKI KAISHA, Toyota (JP)

(72) Inventor: Hideki Kamatani, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/028,026

(22) Filed: Jan. 17, 2025

(65) Prior Publication Data

US 2025/0256714 A1 Aug. 14, 2025

(30) Foreign Application Priority Data

Feb. 13, 2024 (JP) ................................ 2024-019355

(51) Int. Cl.
*B60W 30/14* (2006.01)
*B60W 30/16* (2020.01)
*B60W 30/18* (2012.01)

(52) U.S. Cl.
CPC .......... *B60W 30/143* (2013.01); *B60W 30/16* (2013.01); *B60W 30/18072* (2013.01); *B60W 2520/10* (2013.01); *B60W 2554/4042* (2020.02); *B60W 2554/802* (2020.02)

(58) Field of Classification Search
None
See application file for complete search history.

(56) References Cited

U.S. PATENT DOCUMENTS

| | | | | |
|---|---|---|---|---|
| 5,529,139 | A * | 6/1996 | Kurahashi | B60W 30/18145 318/587 |
| 6,226,588 | B1 * | 5/2001 | Teramura | G01D 7/04 123/319 |
| 2011/0066350 | A1 * | 3/2011 | Sonoda | B60W 30/16 701/96 |
| 2020/0164860 | A1 * | 5/2020 | Morita | B60K 6/365 |
| 2020/0361461 | A1 * | 11/2020 | Eo | B60K 6/387 |
| 2022/0185280 | A1 | 6/2022 | Kamatani et al. | |
| 2023/0098792 | A1 * | 3/2023 | Kamatani | B60W 30/16 701/96 |

FOREIGN PATENT DOCUMENTS

JP 2022-95320 A 6/2022

* cited by examiner

*Primary Examiner* — Daniel L Greene
(74) *Attorney, Agent, or Firm* — Sughrue Mion, PLLC

(57) ABSTRACT

A vehicle driving assistance apparatus executes a following moving control of moving an own vehicle, autonomously executing a powering control of powering the own vehicle and a coasting control of causing the own vehicle to coast alternately, maintaining an inter-vehicle distance between the own vehicle and a preceding vehicle in front of the own vehicle within a predetermined inter-vehicle distance range, and a vehicle moving speed control of moving the own vehicle, autonomously executing the powering control and the coasting control alternately, maintaining a moving speed of the own vehicle within a predetermined vehicle moving speed range. The apparatus executes the following moving control when a moving speed of the preceding vehicle is equal to or smaller than a predetermined vehicle moving speed. The apparatus executes the vehicle moving speed control when the moving speed of the preceding vehicle is greater than the predetermined vehicle moving speed.

5 Claims, 3 Drawing Sheets

VEHICLE DRIVING ASSISTANCE APPARATUS

CROSS-REFERENCE TO RELATED APPLICATIONS

This application claims priority to Japanese patent application No. JP 2024-019355 filed on Feb. 13, 2024, the content of which is hereby incorporated by reference in its entirety.

BACKGROUND

Field

The present invention relates to a vehicle driving assistance apparatus. Description of the related art.

There is known a vehicle driving assistance apparatus which executes a following moving control of moving an own vehicle, autonomously executing a powering control of powering the own vehicle and a coasting control of causing the own vehicle to coast, maintaining an inter-vehicle distance, which is a distance between a preceding vehicle and the own vehicle, within a certain range (see, for example, JP 2022-95320 A). In the vehicle driving assistance apparatus, an energy consumption for moving the own vehicle is reduced by using the coasting control.

When a moving speed of the preceding vehicle is relatively great while the following moving control described above is executed, the inter-vehicle distance increases relatively quickly when the own vehicle coasts by the coasting control. Therefore, a control of moving the own vehicle is immediately switched from the coasting control to the powering control. Therefore, a switch from the coasting control to the powering control is frequently performed, and an amount of energy consumed to move the own vehicle increases.

SUMMARY

An object of the present invention is to provide a vehicle driving assistance apparatus which can suppress an increase in the amount of energy consumed to move the own vehicle while the following moving control is executed.

A vehicle driving assistance apparatus according to the present invention comprises an electronic control unit which executes (i) a following moving control of moving an own vehicle, autonomously executing a powering control of powering the own vehicle and a coasting control of causing the own vehicle to coast alternately, maintaining an inter-vehicle distance between the own vehicle and a preceding vehicle in front of the own vehicle within a predetermined inter-vehicle distance range, and (ii) a vehicle moving speed control of moving the own vehicle, autonomously executing the powering control and the coasting control alternately, maintaining a moving speed of the own vehicle within a predetermined vehicle moving speed range. The electronic control unit is configured to (i) execute the following moving control when a moving speed of the preceding vehicle is equal to or smaller than a predetermined vehicle moving speed, and (ii) execute the vehicle moving speed control when the moving speed of the preceding vehicle is greater than the predetermined vehicle moving speed.

As mentioned above, when the moving speed of the preceding vehicle is relatively great while the following moving control is executed, the inter-vehicle distance increases relatively quickly when the own vehicle is coasted by the coasting control. Therefore, a control of moving the own vehicle is immediately switched from the coasting control to the powering control. Therefore, a switching from the coasting control to the powering control is performed frequently, and the amount of energy consumed to move the own vehicle increases.

According to the vehicle driving assistance apparatus of the present invention, when the moving speed of the preceding vehicle is relatively great, the own vehicle is moved by the vehicle moving speed control. Therefore, a frequent switch from the coasting control to the powering control can be suppressed. As a result, the increase in the amount of energy consumed to move the own vehicle can be suppressed.

In the vehicle driving assistance apparatus according to an aspect of the present invention, the predetermined vehicle moving speed may be a speed obtained by subtracting a value depending on a width of the predetermined vehicle moving speed range from an upper limit value of the predetermined vehicle moving speed range.

According to the vehicle driving assistance apparatus according to this aspect of the present invention, it is determined whether to execute the following moving control or the vehicle moving speed control according to the width of the predetermined vehicle moving speed range. Therefore, the vehicle moving speed control can be executed in more appropriate situations in order to suppress the increase in the amount of energy consumed to move the own vehicle.

In the vehicle driving assistance apparatus according to another aspect of the present invention, the predetermined vehicle moving speed may be a speed which is equal to or smaller than an average vehicle moving speed of the own vehicle realized when the own vehicle is moved by the vehicle moving speed control.

According to the vehicle driving assistance apparatus according to this aspect of the present invention, it is determined whether to execute the following moving control or to execute the vehicle moving speed control using the average vehicle moving speed of the own vehicle realized when the own vehicle is moved by the vehicle moving speed control. Therefore, the vehicle moving speed control can be executed in more appropriate situations, in order to suppress the increase in the amount of energy consumed to move the own vehicle.

The components of the present invention are not limited to the embodiments of the present invention described below with reference to the drawings. Other objects, other features, and incidental advantages of the present invention will be readily understood from the description of the embodiments of the present invention.

DETAILED DESCRIPTION

Figure 1:
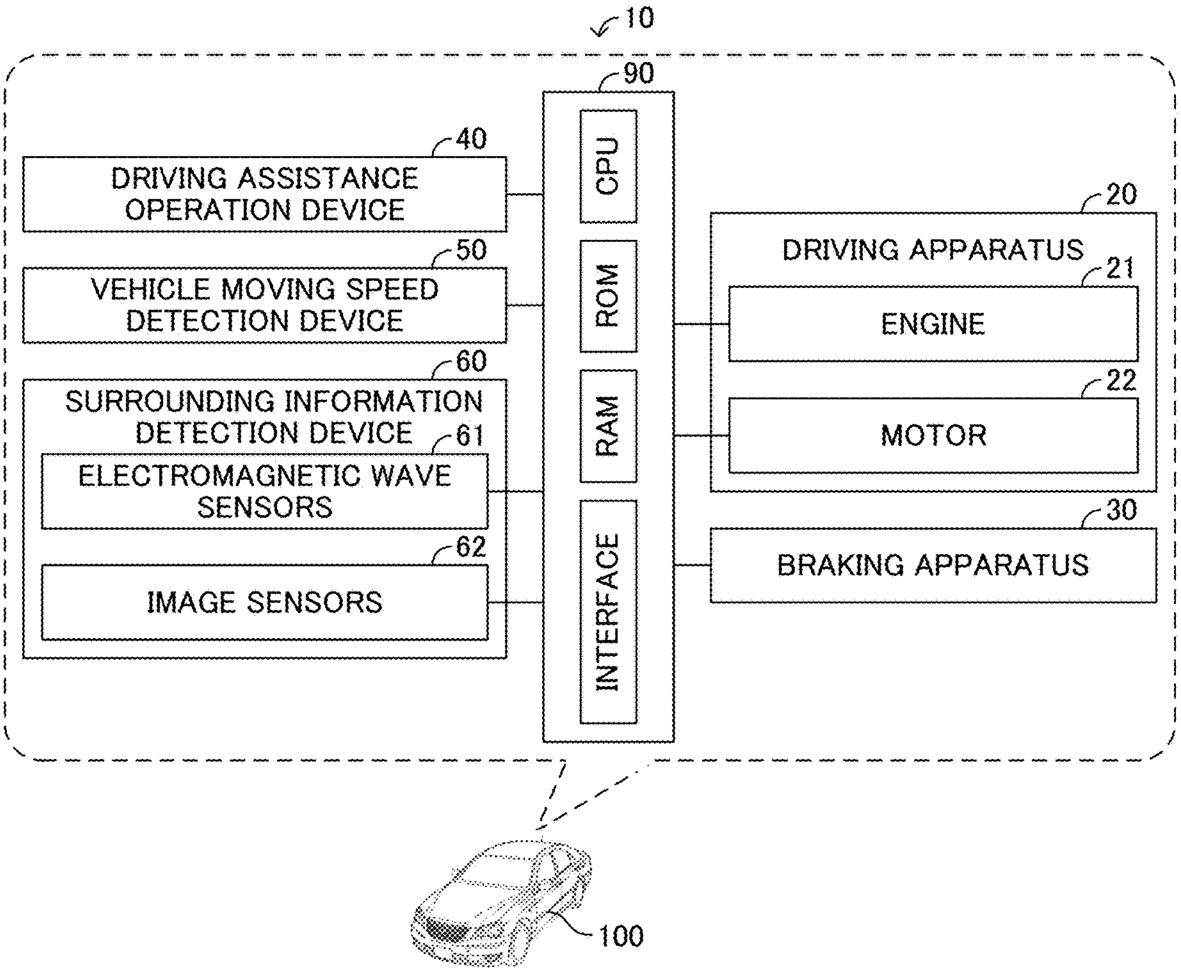
FIG. 1 is a diagram showing a vehicle driving assistance apparatus according to an embodiment of the present invention.

Below, a vehicle driving assistance apparatus according to an embodiment of the present invention will be described with reference to the drawings. FIG. 1 shows the vehicle driving assistance apparatus 10 according to the embodiment of the present invention. The vehicle driving assistance apparatus 10 is installed in an own vehicle 100. The following description of the vehicle driving assistance apparatus 10 is based on the case where an operator of the own vehicle 100 is a person who rides in the own vehicle 100 and drives the own vehicle 100 (i.e., a driver of the own vehicle 100). However, the operator of the own vehicle 100 may also be a person who operates the own vehicle 100 remotely without getting into the own vehicle 100 (i.e., a remote operator of the own vehicle 100). The present invention is also applicable to vehicles which can be driven by an automatic driving control only, as well as vehicles which can be driven by a manual driving operation and the automatic driving control.

As shown in FIG. 1, the vehicle driving assistance apparatus 10 is equipped with an ECU (electronic control unit) 90 as a control device. The ECU 90 is equipped with a microcomputer as a main part. The microcomputer includes a CPU, storage media such as ROM, RAM, and nonvolatile memory, etc., and interfaces, etc. The CPU is configured to execute instructions, programs, or routines stored in the storage medium to realize various functions. In particular, in this embodiment, the vehicle driving assistance apparatus 10 stores in the storage medium programs which realizes various controls executed by the vehicle driving assistance apparatus 10.

It should be noted that, in this embodiment, the vehicle driving assistance apparatus 10 is equipped with only one ECU 90, but it may be configured to be equipped with multiple ECUs and to have each ECU perform the functions of the vehicle driving assistance apparatus 10 described below. In addition, the vehicle driving assistance apparatus 10 may be configured such that the programs stored in the storage medium can be updated by wireless communication (e.g., Internet communication) with external devices.

As shown in FIG. 1, the own vehicle 100 is equipped with a driving apparatus 20, a braking apparatus 30, a driving assistance operation device 40, a vehicle moving speed detection device 50, and a surrounding information detection device 60.

The driving apparatus 20 is an apparatus which generates a driving force applied to the own vehicle 100 (in particular, driving wheels of the own vehicle 100). In this embodiment, the driving apparatus 20 includes an internal combustion engine 21 and at least one motor 22. The driving apparatus 20 is electrically connected to the ECU 90. The vehicle driving assistance apparatus 10 controls the driving force provided to the own vehicle 100 by controlling an operation of the driving apparatus 20 (i.e., the internal combustion engine 21 and the motor 22).

The braking apparatus 30 is an apparatus which applies a braking force to the own vehicle 100 (in particular, wheels of the own vehicle 100). The braking apparatus 30 is, for example, a hydraulic brake device. The braking apparatus 30 is electrically connected to the ECU 90. The vehicle driving assistance apparatus 10 controls the braking force applied to the own vehicle 100 by controlling an operation of the braking apparatus 30.

The driving assistance operation device 40 is a device which is operated by the driver of the own vehicle 100 to request an execution of a following moving control described below or to request a stop of the execution of a following moving control. The driving assistance operation device 40 is electrically connected to the ECU 90. In this embodiment, when the driving assistance operation device 40 is operated while the vehicle driving assistance apparatus 10 is not executing the following moving control, the vehicle driving assistance apparatus 10 determines that the execution of the following moving control is requested. On the other hand, when the driving assistance operation device 40 is operated while the vehicle driving assistance apparatus 10 is executing the following moving control, the vehicle driving assistance apparatus 10 determines that the stop of the execution of the following moving control is requested.

The vehicle moving speed detection device 50 is a device which detects a moving speed of the own vehicle 100. The vehicle moving speed detection device 50 includes, for example, equipped wheel rotation speed sensors provided in each wheel of the own vehicle 100. The vehicle moving speed detection device 50 is electrically connected to the ECU 90. The vehicle driving assistance apparatus 10 acquires the moving speed of the own vehicle 100 as an own vehicle moving speed Vego using the vehicle moving speed detection device 50.

The surrounding information detection device 60 is a device which detects information on surroundings of the own vehicle 100. In this embodiment, the surrounding information detection device 60 includes electromagnetic wave sensors 61 and image sensors 62. The electromagnetic wave sensors 61 and the image sensors 62 are electrically connected to the ECU 90. The electromagnetic wave sensor 61 is, for example, a radar sensor such as a millimeter wave radar. The vehicle driving assistance apparatus 10 acquires information on objects in the vicinity of the own vehicle 100 using the electromagnetic wave sensors 61 as surrounding information IS. In addition, the image sensor 62 is, for example, a camera sensor. The vehicle driving assistance apparatus 10 acquires image information on the vicinity of the own vehicle 100 using the image sensors 62 as the surrounding information IS.

Operation of Vehicle Driving Assistance Apparatus

Next, an operation of the vehicle driving assistance apparatus 10 will be described. The vehicle driving assistance apparatus 10 is configured to execute a routine shown in FIG. 2 at predetermined time intervals, and when predetermined conditions are satisfied, to execute the following moving control or the vehicle moving speed control as an automatic driving control.

Figure 3:
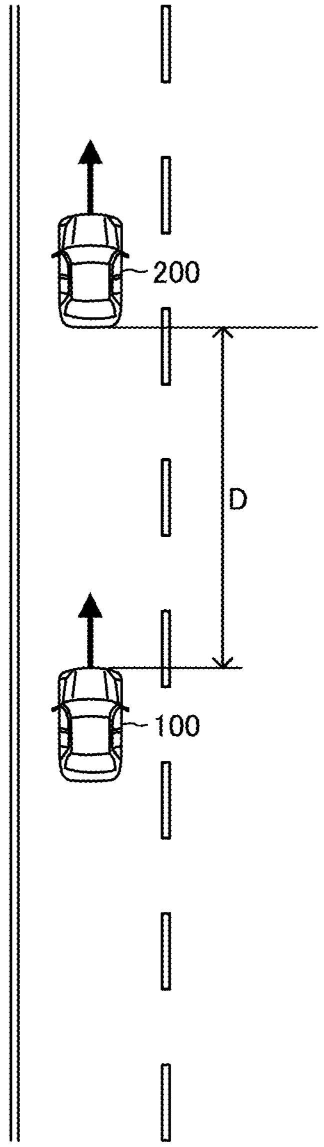
FIG. 3 is a diagram showing a scene in which a preceding vehicle is in front of the own vehicle.

The following moving control is a control of moving the own vehicle 100, autonomously or automatically executing a powering control and a coasting control alternately, maintaining an inter-vehicle distance D within a predetermined inter-vehicle distance range RD when a preceding vehicle 200 is present as shown in FIG. 3.

The powering control is a control of powering the own vehicle 100 by providing the driving force to the own vehicle 100 from the driving apparatus 20. In particular, the powering control is an optimal powering control of powering the own vehicle by providing the driving force to the own vehicle 100 from the driving apparatus 20, operating the driving apparatus 20 with an optimal energy efficiency. On the other hand, the coasting control is a control of causing the own vehicle 100 to coast by cutting a connection between the driving apparatus 20 and the driven wheels of the own vehicle 100, thereby making the driving force provided from the driving apparatus 20 to the own vehicle 100 zero.

The preceding vehicle 200 is another vehicle which is moving in a traffic lane in which the own vehicle 100 is moving, and is within a predetermined distance ahead of the own vehicle 100. In addition, the inter-vehicle distance D is a distance between the own vehicle 100 and the preceding vehicle 200. The vehicle driving assistance apparatus 10 determines whether or not the preceding vehicle 200 exists based on the surrounding information IS. In addition, the vehicle driving assistance apparatus 10 acquires the inter-vehicle distance D based on the surrounding information IS.

In this embodiment, the predetermined inter-vehicle distance range RD is a range in which a lower limit value Dlower is a set inter-vehicle distance Dset and an upper limit value Dupper is a distance which is longer than the set inter-vehicle distance Dset by a predetermined width WD (or a predetermined value). The set inter-vehicle distance Dset is set by the driver. The predetermined width WD may be a constant value which is independent of the vehicle moving speed Vego, or it may be a value which varies depending on the vehicle moving speed Vego, specifically, a value which becomes greater as the vehicle moving speed Vego increases.

When the inter-vehicle distance D becomes longer than the upper limit value Dupper of the predetermined inter-vehicle distance range RD while the following moving control is executed, the vehicle driving assistance apparatus 10 starts the powering control. On the other hand, when the inter-vehicle distance D becomes shorter than the lower limit value Dlower of the predetermined inter-vehicle distance range RD while the following moving control is executed, the vehicle driving assistance apparatus 10 starts the coasting control.

It should be noted that, in this embodiment, when the vehicle moving speed Vego rises to the set vehicle moving speed Vset while the vehicle driving assistance apparatus 10 executes the following moving control, the vehicle driving assistance apparatus 10 causes the own vehicle 100 to run, autonomously or automatically controlling the operations of the driving apparatus 20 and the braking apparatus 30, maintaining the vehicle moving speed Vego at the set vehicle moving speed Vset. The predetermined vehicle moving speed Vset is set by the driver.

On the other hand, the vehicle moving speed control is a control of moving the own vehicle 100, autonomously or automatically executing the powering control and the coast control alternately, maintaining the vehicle moving speed Vego within a predetermined vehicle moving speed range RV.

In this embodiment, the predetermined vehicle moving speed range RV is a range where an upper limit value Vupper is the set vehicle moving speed Vset, and a lower limit value Vlower is a vehicle moving speed which is slower than the set vehicle moving speed Vset by a predetermined width WV (or a predetermined value). As mentioned above, the set speed Vset is a vehicle moving speed set by the driver. The predetermined width WV may be a constant value which is independent of the vehicle moving speed Vego, or it may be a value which varies depending on the vehicle moving speed Vego, specifically, a value which becomes greater as the vehicle moving speed Vego becomes faster.

When the own vehicle moving speed Vego becomes faster than the upper limit value Vupper of the predetermined vehicle moving speed range RV while the vehicle moving speed control is executed, the vehicle driving assistance apparatus 10 starts the coasting control. On the other hand, when the own vehicle moving speed Vego becomes slower than the lower limit value Vlower of the predetermined vehicle moving speed range RV while the vehicle moving speed control is executed, the vehicle driving assistance apparatus 10 starts the powering control.

Figure 2:
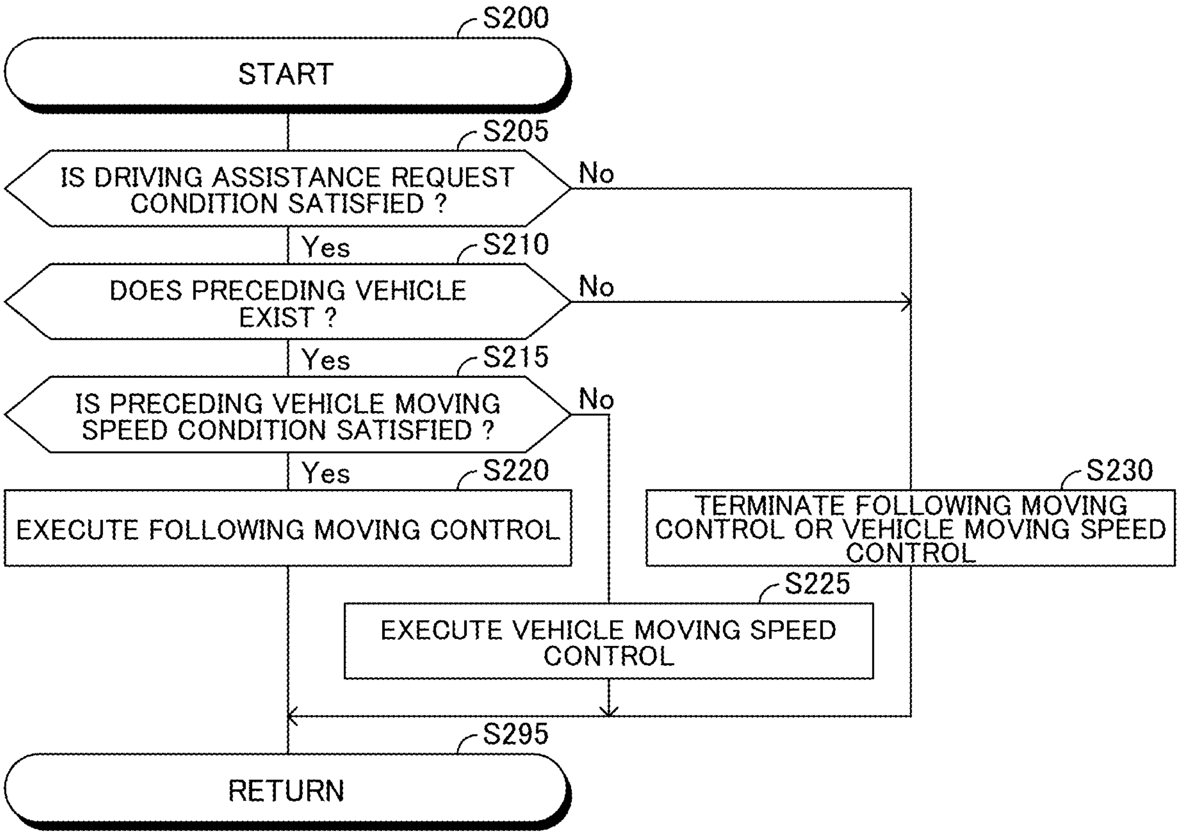
FIG. 2 is a flowchart showing a routine executed by the vehicle driving assistance apparatus according to the embodiment of the present invention.

At a predetermined timing, the vehicle driving assistance apparatus 10 starts processing from a step S200 of the routine shown in FIG. 2, and proceeds with the processing to a step S205 to determine whether a driving assistance request condition C1 is satisfied or not. The driving assistance request condition C1 is a condition in which the driver has requested that the following moving control be executed.

When the vehicle driving assistance apparatus 10 determines "Yes" at the step S205, the vehicle driving assistance apparatus 10 proceeds to a step S210 and determines whether or not the preceding vehicle 200 exists.

When the vehicle driving assistance apparatus 10 determines "Yes" at the step S210, the vehicle driving assistance apparatus 10 proceeds to a step S215 and determines whether or not a preceding vehicle moving speed condition C2 is satisfied. The preceding vehicle moving speed condition C2 is a condition in which it is possible to make the own vehicle 100 follow the preceding vehicle 200 by the following moving control. In this embodiment, the preceding vehicle moving speed condition C2 is a condition in which a preceding vehicle moving speed Vpre is less than or equal to a predetermined vehicle moving speed Vth. The preceding vehicle moving speed Vpre is the moving speed of the preceding vehicle 200. The vehicle driving assistance apparatus 10 acquires the preceding vehicle moving speed Vpre based on the surrounding information IS and the own vehicle moving speed Vego.

The predetermined vehicle moving speed Vth can be any vehicle moving speed which is set as appropriate to obtain effects described below. In this embodiment, the predetermined vehicle moving speed Vth is a value obtained by subtracting a value ΔV depending on the width WV of the predetermined vehicle moving speed range RV from the upper limit value Vupper of the predetermined vehicle moving speed range RV ($Vth=Vupper-\Delta V$). In particular, in this embodiment, the value ΔV depending on the width WV of the predetermined vehicle moving speed range RV is a value obtained by multiplying the width WV of the predetermined vehicle moving speed range RV by a predetermined coefficient k ($\Delta V=WV\cdot k$). In this embodiment, the predetermined coefficient k is a value smaller than "1". The predetermined coefficient k is set such that the predetermined vehicle moving speed Vth is less than or equal to an average vehicle moving speed Vave of the own vehicle 100 realized when the own vehicle 100 is moved by the vehicle moving speed control ($Vth\leq Vave$). Alternatively, the predetermined coefficient k is set such that the predetermined vehicle moving speed Vth is less than or equal to the vehicle moving speed Vcenter at the center of the predetermined vehicle moving speed range RV ($Vth\leq Vcenter$).

When the vehicle driving assistance apparatus 10 determines "Yes" at the step S215, the vehicle driving assistance apparatus 10 proceeds to a step S220 and executes the following moving control. The vehicle driving assistance apparatus 10 then proceeds to a step S295 and terminates the processing of this routine.

On the other hand, when the vehicle driving assistance apparatus 10 determines "No" at the step S215, the vehicle driving assistance apparatus 10 proceeds to a step S225 and executes the vehicle moving speed control. In other words, even when the preceding vehicle 200 exists and the execution of following moving control is requested, when the preceding vehicle moving speed Vpre is greater than the predetermined vehicle moving speed Vth, the vehicle driving assistance apparatus 10 executes the vehicle moving speed control. The vehicle driving assistance apparatus 10 then proceeds to the step S295 and terminates the processing of this routine.

In addition, when the vehicle driving assistance apparatus 10 determines "No" at the step S205 or the step S210, the vehicle driving assistance apparatus 10 proceeds to a step S230 and, when the following moving control or the vehicle moving speed control is executed, terminates the execution of the following moving control or the vehicle moving speed control. The vehicle driving assistance apparatus 10 then proceeds to the step S295 and terminates the processing of this routine.

The operation of the vehicle driving assistance apparatus 10 has been described.

When the preceding vehicle moving speed Vpre is relatively great while the following moving control is executed, the inter-vehicle distance D increases relatively quickly when the own vehicle 100 is coasted by the coasting control. Therefore, a control of moving the own vehicle 100 immediately switches from the coasting control to the powering control. Therefore, a switch from the coasting control to the powering control is performed frequently, and an amount of energy consumed to move the own vehicle 100 increases.

According to the vehicle driving assistance apparatus 10, when the preceding vehicle moving speed Vpre is relatively great, the own vehicle 100 is moved by the vehicle moving speed control. Therefore, the frequent switch from the coasting control to the powering control can be suppressed, and as a result, an increase in the amount of energy consumed to move the own vehicle 100 can be suppressed.

It should be noted that the present invention is not limited to the above embodiments, and various modified examples can be adopted within the scope of the present invention.

What is claimed is:

1. A vehicle driving assistance apparatus comprising an electronic control unit configured to execute:

a following moving control for moving an own vehicle by autonomously and alternately executing a powering control of powering the own vehicle and a coasting control of causing the own vehicle to coast while maintaining an inter-vehicle distance between the own vehicle and a preceding vehicle in front of the own vehicle within a predetermined inter-vehicle distance range; and a vehicle moving speed control for moving the own vehicle by autonomously and alternately executing the powering control and the coasting control while maintaining a moving speed of the own vehicle within a predetermined vehicle moving speed range, wherein the electronic control unit is configured to:

execute the following moving control based on a determination that the preceding vehicle exists and a moving speed of the preceding vehicle is equal to or smaller than a predetermined vehicle moving speed; and execute the vehicle moving speed control instead of the following moving control based on a determination that the preceding vehicle exists and the moving speed of the preceding vehicle is greater than the predetermined vehicle moving speed.

2. The vehicle driving assistance apparatus according to claim 1, wherein the predetermined vehicle moving speed is a speed obtained by subtracting a value depending on a width of the predetermined vehicle moving speed range from an upper limit value of the predetermined vehicle moving speed range.

3. The vehicle driving assistance apparatus according to claim 1, wherein the predetermined vehicle moving speed is a speed which is equal to or smaller than an average vehicle moving speed of the own vehicle realized when the own vehicle is moved by the vehicle moving speed control.

4. The vehicle driving assistance apparatus according to claim 1, wherein the electronic control unit is configured to:

determine whether a driver has requested execution of the following moving control, and based on a determination that the driver has requested execution of the following moving control, determine whether the preceding vehicle exists.

5. The vehicle driving assistance apparatus according to claim 1, wherein the predetermined vehicle moving speed is obtained by subtracting, from an upper limit value of the predetermined vehicle moving speed range, a value obtained by multiplying a width of the predetermined vehicle moving speed range by a predetermined coefficient less than one.

* * * * *